US010186237B2

(12) United States Patent
Ciechanowski

(10) Patent No.: US 10,186,237 B2
(45) Date of Patent: Jan. 22, 2019

(54) GLYPH-MASK RENDER BUFFER

(71) Applicant: Apple Inc., Cupertino, CA (US)

(72) Inventor: Bartosz Ciechanowski, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 15/612,756

(22) Filed: Jun. 2, 2017

(65) Prior Publication Data

US 2018/0350327 A1 Dec. 6, 2018

(51) Int. Cl.

| | |
|---|---|
| ***G09G 5/32*** | (2006.01) |
| ***G09G 5/39*** | (2006.01) |
| ***G09G 5/28*** | (2006.01) |
| ***H04N 1/60*** | (2006.01) |
| ***G09G 5/397*** | (2006.01) |
| ***G09G 5/393*** | (2006.01) |
| ***G09G 5/377*** | (2006.01) |

(52) U.S. Cl.

CPC ............... *G09G 5/397* (2013.01); *G09G 5/32* (2013.01); *G09G 5/377* (2013.01); *G09G 5/393* (2013.01); *G09G 5/28* (2013.01); *G09G 2360/18* (2013.01)

(58) Field of Classification Search

CPC combination set(s) only.
See application file for complete search history.

(56) References Cited

U.S. PATENT DOCUMENTS

| | | | | |
|---|---|---|---|---|
| 5,940,080 A | 8/1999 | Ruehle | | |
| 7,796,139 B1 | 9/2010 | Feierbach | | |
| 7,904,807 B2 | 3/2011 | Bell | | |
| 8,855,414 B1 | 10/2014 | Hobbs | | |
| 2010/0045691 A1* | 2/2010 | Naito | G09G 5/36 | 345/581 |
| 2013/0120657 A1* | 5/2013 | Dick | G09G 5/393 | 348/607 |
| 2015/0026549 A1 | 1/2015 | Shao | | |

* cited by examiner

*Primary Examiner* — Wesner Sajous
(74) *Attorney, Agent, or Firm* — Blank Rome LLP

(57) ABSTRACT

Systems, methods, and computer readable media to improve the operation of a computer's display system are described. In general, techniques are disclosed for retaining glyph-mask information for text associated with a region that may be arbitrarily moved across a screen. More particularly, techniques disclosed herein utilize an additional off-screen buffer referred to as the glyph-mask buffer. The glyph-mask buffer coincides with an existing side buffer in extent, but is used only to retain anti-aliased glyph information (i.e., glyph-masks). When the side buffer's content is updated, the effect of that update on the region's text may be reflected in an update to the glyph-mask buffer. At display time, the region corresponding to the side buffer, and the text therein, may be properly rendered at any screen location by combining the screen's target display area (background), the side buffer and the glyph-mask buffer.

21 Claims, 7 Drawing Sheets

GLYPH-MASK RENDER BUFFER

BACKGROUND

This disclosure relates generally to display systems. More particularly, but not by way of limitation, this disclosure relates to techniques for properly rending text into a region of the display that may move arbitrarily from region to region on the display.

In some modern display systems an extra buffer (aka, a side buffer) may be used to store material that can move from one region of a display to another region (aka, dynamic material). When the material contained in the side buffer is moved, the entire side buffer may be blended into the background of the second region. While this approach works well much of the time, it does not work well when text is part of the information stored in the side buffer. To properly render text, it is necessary to know what is behind the text. This is why input to a text render pipeline includes the R (red), G (green), B (blue) and alpha (transparency) of each text character plus each character's RGB glyph-mask (i.e., 7 inputs). Side buffers have only 4 channels: R, G, B and alpha. As a result, once text is rendered into a side buffer it is no longer possible to render that text onto the screen properly as its glyph-mask information is no longer available.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment the disclosed concepts provide a method to properly render dynamic material that includes anti-aliased text. As used herein, dynamic material may be moved from one location or region on a display screen to another location or region. The phrase "anti-aliased text" means text that has a corresponding glyph-mask. Also as used herein, anti-aliased text may be considered properly rendered when the text's corresponding glyph-mask is taken into account when rendering. Methods in accordance with this disclosure include storing, in a first memory (e.g., an off-screen buffer memory), first information for display on a display unit, the display unit having a full display area, the first memory corresponding to a first region of the full display area, the first region corresponding to less than all of the display unit's full display area, wherein the first information includes color and transparency content; storing, in a second memory (e.g., a second off-screen buffer memory), glyph-mask information (e.g., associated with anti-aliased text) of the first information, the second memory having a size equal to the first memory (in some embodiments, the first and second memories may have a 1:1 correspondence in pixels); detecting a change in location of the first region to a second region of the full display area, the second region having second information; updating the first information in the first memory to new information based on the first information, the second information and the glyph-mask information; and updating the glyph-mask information in the second memory by removing the glyph-mask information from the second memory when the glyph-mask information corresponds to opaque new information in the first memory, and blending the glyph-mask information in the second memory with the new information when the glyph-mask information corresponds to translucent new information in the first memory. In one or more other embodiments updating the first information comprises blending the first information's color and transparency content with color and transparency information of the second information. In still other embodiments the first and second memory may comprise off-screen memory which itself can be backing memory for a compositing engine of an operating system. In yet other embodiments, the various methods described herein may be embodied in computer executable program code or instructions and stored in a non-transitory storage device. In yet another embodiment, the method may be implemented in an electronic device having a display unit, memory and a compositing engine.

DETAILED DESCRIPTION

Figure 1A:
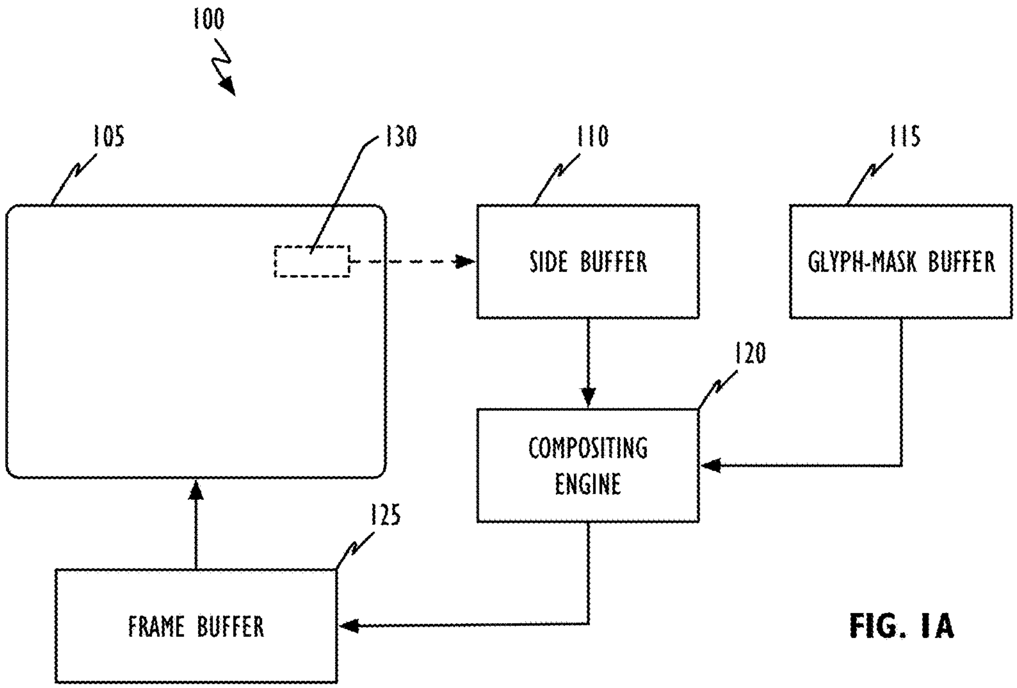
FIGS. 1A and 1B show, in block diagram form, a display system in accordance with one or more embodiments.

This disclosure pertains to systems, methods, and computer readable media to improve the operation of a computer's display system. In general, techniques are disclosed for retaining glyph-mask information for text associated with a region that may be arbitrarily moved across a screen. More particularly, techniques disclosed herein utilize an additional off-screen buffer referred to as the glyph-mask buffer. The glyph-mask buffer coincides with an existing side buffer in extent, but is used only to retain anti-aliased glyph information (i.e., glyph-masks). When the side buffer's content is updated, the effect of that update on the region's text may be reflected in an update to the glyph-mask buffer. At display time, the region corresponding to the side buffer, and the text therein, may be properly rendered at any screen location by combining the screen's target display area (background), the side buffer and the glyph-mask buffer.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of computer display systems having the benefit of this disclosure.

Figure 1B:
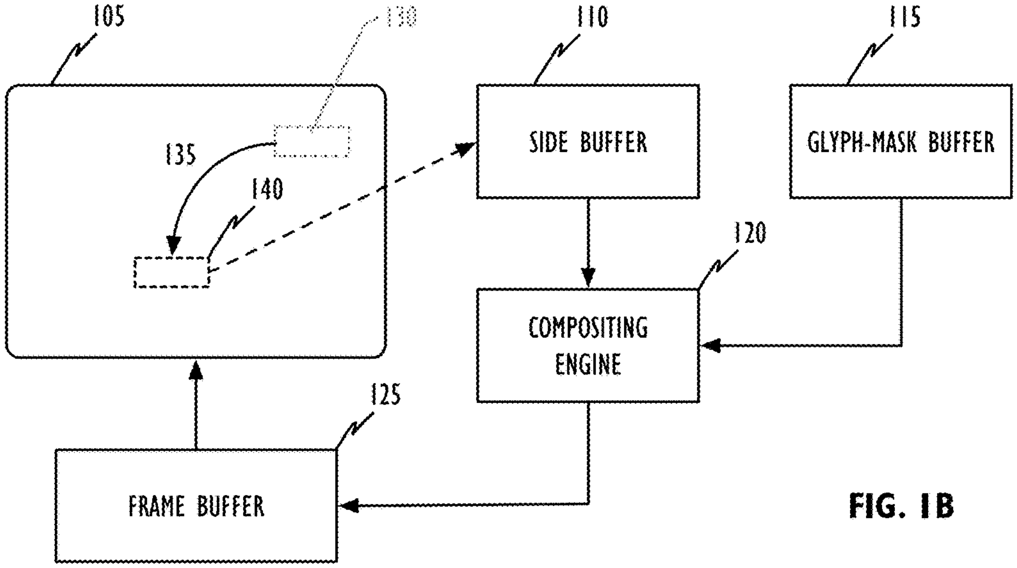

Referring to FIG. 1A, display system 100 in accordance with one or more embodiments includes display element or screen 105, side buffer 110, glyph-mask buffer 115, compositing engine 120 and frame buffer 125. As shown, side buffer 110 is associated with region 130 of display screen 105. During operation, the on-screen data representing region 130 may be copied into side buffer 110 and, should screen region 130 contain content associated with anti-aliased text information (i.e., a glyph-mask), that information may be placed into glyph-mask buffer 115. Both side buffer 110 and glyph-mask buffer 115 are off-screen memory used by compositing engine 125 to update frame buffer 125. Frame buffer 125, in turn, contains a representation of what will be displayed on screen 105. In some embodiments, compositing engine 120 may include one or more graphics processing units (GPUs). In other embodiments, compositing engine may use custom-designed image pipeline hardware. In yet other embodiments, compositing engine 120 may represent a software-based engine using one or more central processing units (CPUs). Referring to FIG. 1B, when region 130 is moved (arrow 135) to a new location on screen 105 (e.g., region 140), the content of side buffer 110 may be blended with the content of region 140 taking into account the glyph-mask information contained in glyph-mask buffer 115. In this way, regions that may be moved dynamically across a display screen and which include anti-aliased text, may be correctly rendered.

Another way to think about the side buffer/glyph-mask buffer system is as two planes of a single underlying memory. In this model, side buffer 110 corresponds to the memory content's color plane and glyph-mask buffer 115 corresponds to the memory content's glyph-mask plane. In one embodiment, each pixel in the color plane (side buffer) may carry color or chroma and transparency information. In the RGB color space this could be represented as (R, G, B, α), where "α" represents transparency. Similarly, each pixel in the glyph-mask plane (glyph-mask buffer) carries any glyph's color information. In the RGB color space this could be represented as ($M_R$, $M_G$, $M_B$). In the glyph-mask plane or buffer, only glyph information is retained. That is, if a particular pixel in the color plane (side buffer) is not associated with anti-aliased text having a glyph-mask, that pixel's corresponding value in the glyph-mask plane or buffer may be set to a value corresponding to fully transparent (or some other empty or nugatory value).

Figure 2:
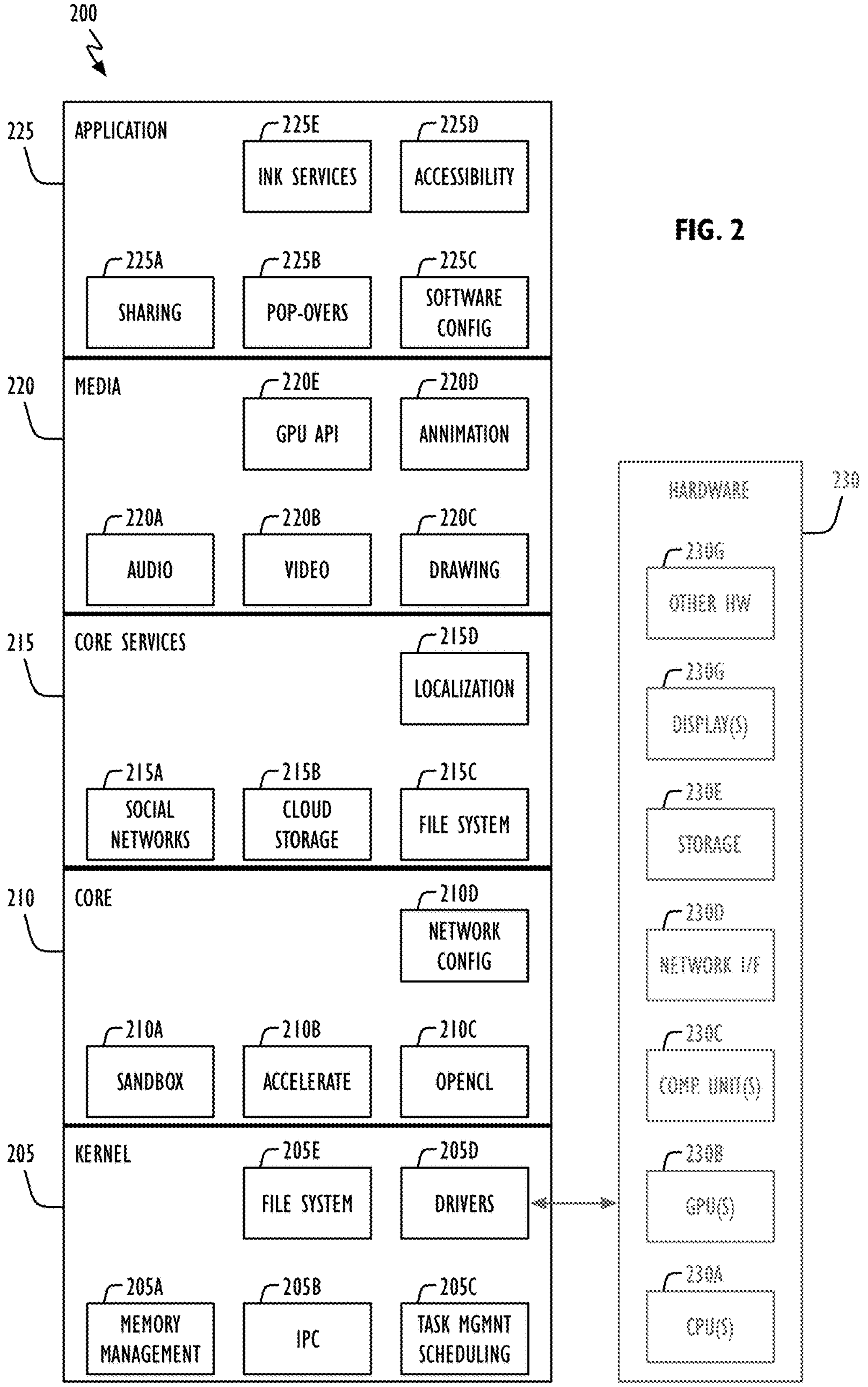
FIG. 2 shows, in block diagram form, an operating system in accordance with one or more embodiments.

In some embodiments, compositing (or render) engine 120 may be implemented as a function provided by the operating system (OS). One way to represent an OS diagrammatically is as a number of separate layers stacked one atop the other as shown in FIG. 2. There, illustrative OS 200 includes kernel layer 205, core layer 210, core services layer 215, media layer 220 and application layer 225 coupled to various hardware components 230. Kernel layer 205 is generally responsible for memory management including cache and virtual memory (205A), interprocess communication (205B), task management and scheduling (205C), and support for drivers (205D) and a file system (205E). By way of example, and not by limitation, drivers 205D control specific hardware devices such as one or more central processing units (CPUs) 230A, one or more graphics processing units (GPUs) 230B, one or more other computational units 230C such as a vector unit, network interface hardware 230D, one or more storage devices 230E, one or more display units 230F, and other hardware 230G. Core layer 210 provides low-level services related to hardware and networks. For example, core layer 210 may include functionality to sandbox applications (210A), access and use hardware vector units (210B), program use of parallel CPUs (or CPU cores) through, for example, OpenCL® (210C) and dynamically detect and configure remote networks (210D). (OPENCL is a registered trademark of Apple Inc.) Core services layer 215 may provide essential services to applications while having no direct bearing on the applications' user interface. Core services layer 215 may provide functionality to share content among different social networking services (215A), use cloud- or network-based storage (215B), eliminate file-system inconsistencies due to overlapping read and write operations from different processes (215C), and localization services for text and graphics (215D). Media layer 220 may provide services related to media processing including audio capture and playback (220A), video capture and playback (220B), two- and three-dimensional drawing (220C), animation (220D), and access to, and control of, GPU hardware through, for example, Metal® and OpenGL® APIs (220E). (METAL is a registered trademark of Apple Inc. OPENGL is a registered trademark of Silicon Graphics International Corporation.) In one embodiment, compositing engine 120 could be implemented as part of media layer 220. In another embodiment, compositing engine 120 could be implemented through components or functions from multiple layers of the OS. Application layer 225 may be responsible for the appearance of applications and their responsiveness to user actions. Accordingly, application layer 225 may provide the following functionality: a consistent user experience for sharing content among different types of services (225A) such as between a photo management application and an email application; pop-over windows (225B); software configuration management (225C) through, for example, p-lists; system accessibility through assistive technologies that help users with special needs (225D); and ink services for programmatic handwriting recognition and the direct manipulation of text by means of gestures (225E). Thick lines between each layer represent application programming interfaces (APIs) and/or system programming interfaces (SPIs). The difference between an API and an SPI is often one of access or privilege. APIs are typically published. That is, they are public so that application developers may use the features and functions associated with the API. SPIs are most often not made available to the public. Instead, SPIs are used by components of the OS itself for inter-component (or layer) communication.

Figure 3:
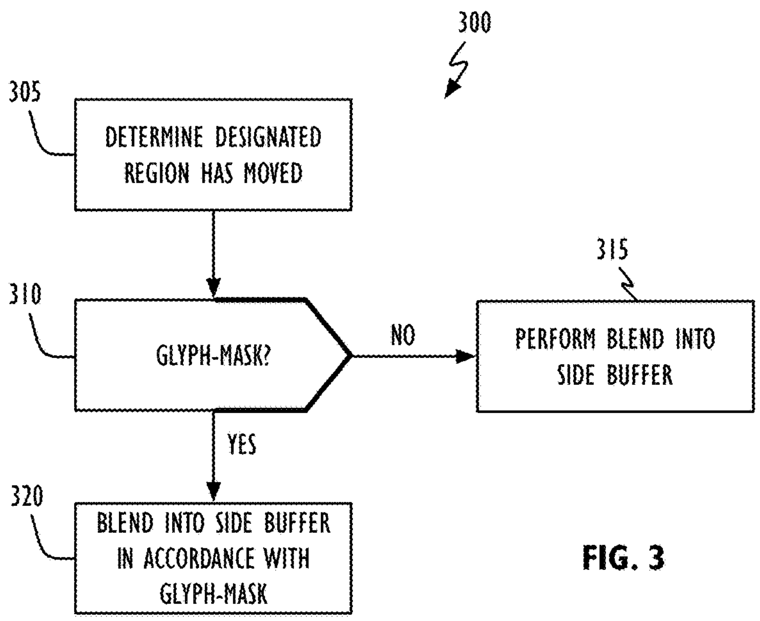
FIG. 3 shows, in flowchart form, a glyph-aware render operation in accordance with one or more embodiments.

Referring to FIG. 3, render operation 300 in accordance with one or more embodiments may be triggered when a designated region of the display area (e.g., region 130) is detected to have moved (e.g., to region 140) (block 305). A test may then be made to determine if either region (e.g., 130 or 140) includes anti-aliased text (block 310); text having an associated glyph-mask. If no glyph-mask information is present (the "NO" prong of block 310), the source region (e.g., 130) and destination region (e.g., 140) may be blended in accordance with any suitable known technique (block 315). If either the source or destination regions include text having a glyph-mask (the "YES" prong of block 310), the glyph information is taken into account when combining or blending the two regions (block 320).

Figure 4:
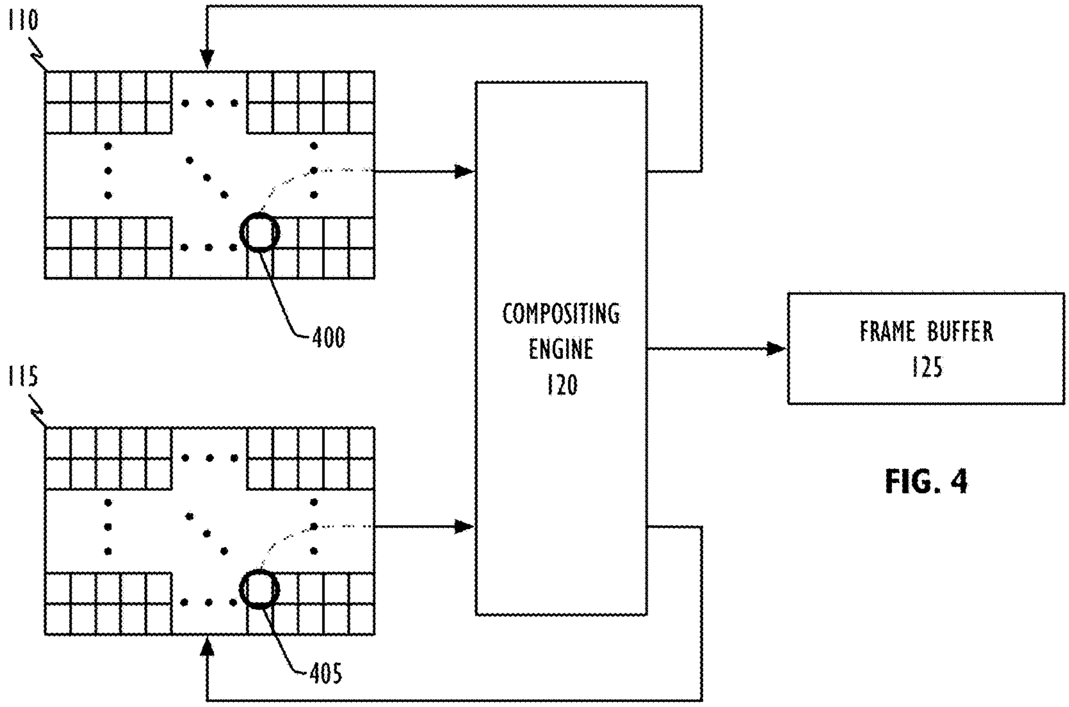
FIG. 4 shows, in block diagram form, part of a display system in accordance with one or more embodiments.

Before discussing the details of one implementation of a glyph-aware rendering operation, it may be helpful to take a closer look at certain aspects of display system 100. Referring to FIG. 4, in one or more embodiments side buffer 110 and glyph-mask buffer 115 are shown having a 1:1 pixel correspondence. That is, each pixel in side buffer 110 has a corresponding pixel in glyph-mask buffer 115 and versa visa. During render operations, corresponding pixels in the two buffers (e.g., pixels 400 and 405) are operated on at the same time (denoted by dashed lines) by compositing engine 120, with the result being returned to the appropriate buffer and, perhaps, frame buffer 125. In some embodiments, side buffer 110 and glyph-mask buffer 115 may be system backing memory for compositing engine 120 which, as noted above, may be an OS provided function.

Figure 5:
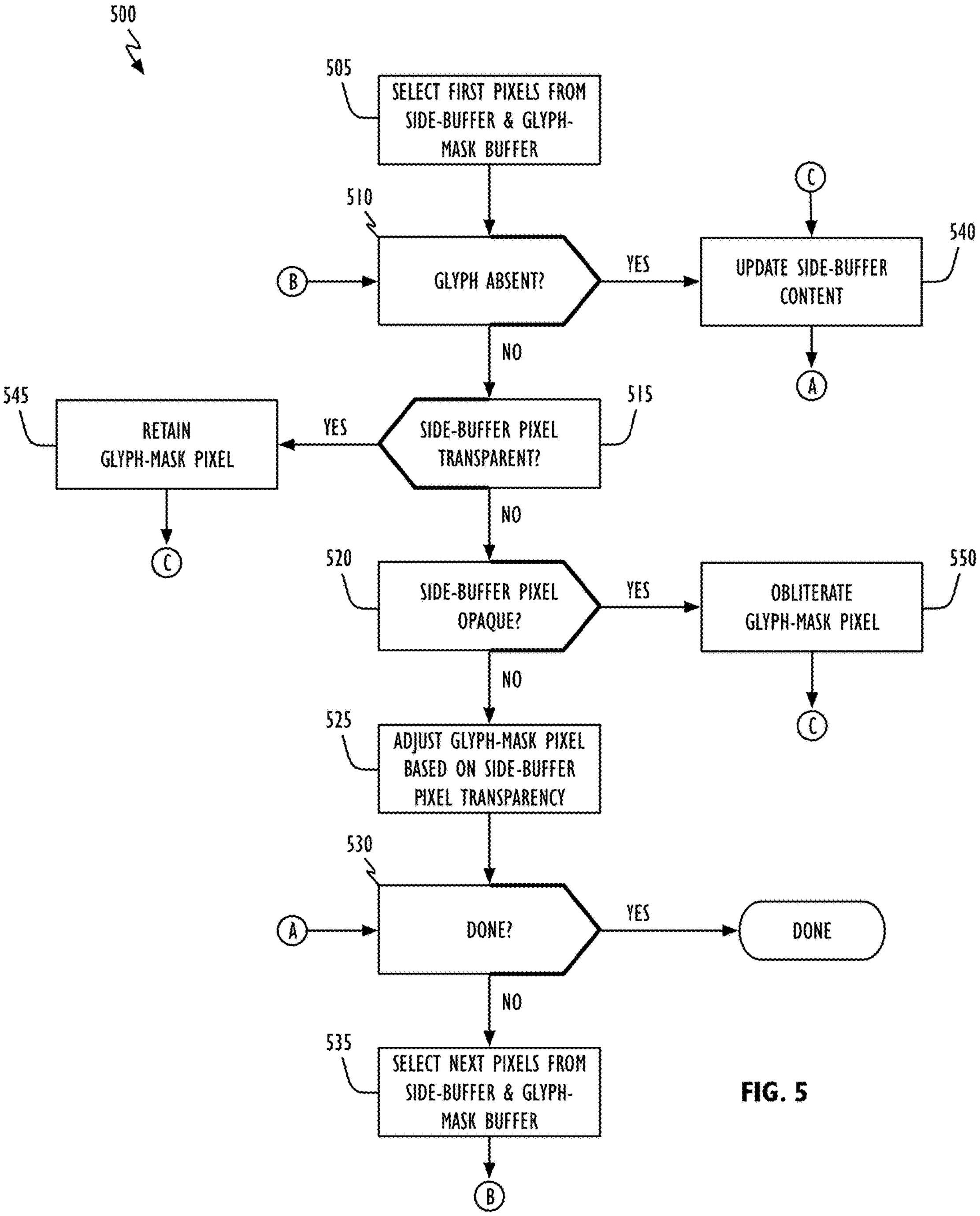
FIG. 5 shows, in flowchart form, another glyph-aware render operation in accordance with one or more embodiments.

Referring to FIG. 5, glyph-aware render operation 500 in accordance with one or more embodiments may begin by selecting a first pixel in side buffer 110 and the corresponding pixel in glyph-mask buffer 115 (block 505). If the selected glyph-mask buffer pixel is associated with a glyph-mask (the "NO" prong of block 510), a further check may be made to determine if the selected side buffer pixel is transparent (block 515). If the selected side buffer pixel is not transparent (the "NO" prong of block 515), another check may be made to determine if the selected side buffer pixel is opaque (block 520). If the selected side buffer pixel is not opaque (the "NO" prong of block 520), the selected glyph-mask pixel may be updated based on the selected side buffer pixel's transparency using that transparency as a interpolation factor between full and empty mask (block 525). Another issue that may be addressed during actions in accordance with block 525, is the case when glyph-masks overlap. This can result, for example, due to a font's design or simply drawing overlapping text. In such cases it has been found useful to take the maximum value of each pixel's mask value (on a per-channel basis). If at least one pixel pair remains to be evaluated in the side/glyph-mask buffer system (the "NO" prong of block 530), the next pixel from side buffer 110 and the corresponding pixel from glyph-mask buffer 115 may be chosen (block 535), where after glyph-aware render operation 500 continues at block 510 (B). Returning to block 510, if the selected glyph-mask pixel has no associated glyph-mask information (the "YES" prong of block 510), the selected side buffer pixel may be updated (with display information) in any suitable manner (block 540), where after operation 500 continues at block 530 (A). Returning to block 515, if the selected side buffer pixel is transparent (the "YES" prong of block 515), the selected glyph-mask pixel is fully retained in the glyph-mask buffer (block 545), where after glyph-aware render operation 500 continues at block 540 (C). Returning to block 520, if the selected side buffer pixel is opaque (the "YES" prong of block 520), the selected glyph-mask pixel is fully removed (obliterated) from the glyph-mask buffer (block 550), where after render operation 500 continues at block 540 (C). Returning finally to block 530, if all side/glyph-mask buffer pixels have been evaluated (the "YES" prong of block 530), glyph-aware render operation 500 is complete.

Figure 6:
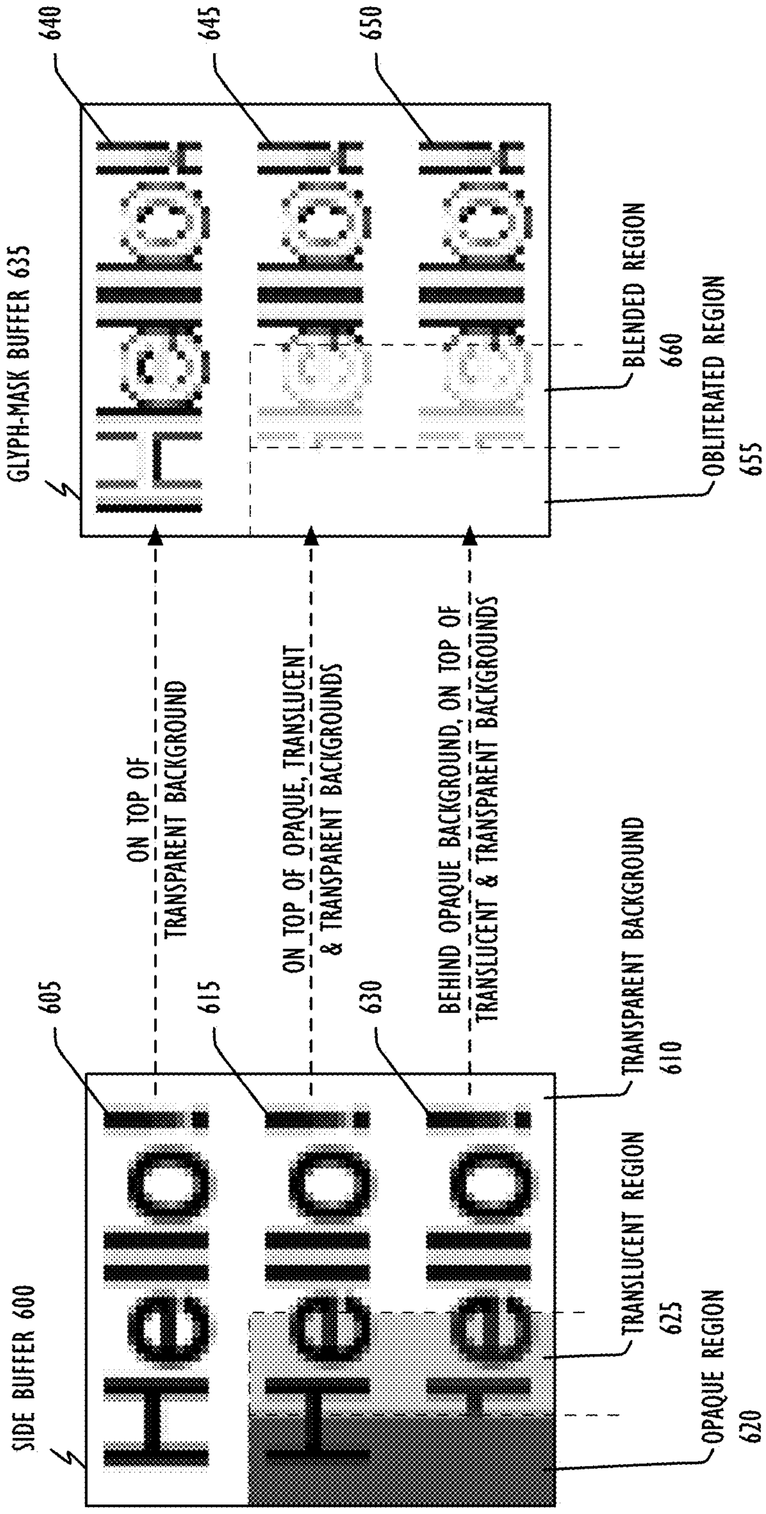
FIG. 6 illustrates the contents of a side buffer/glyph-mask buffer pair in accordance with one or more embodiments.

To see how various actions in accordance with render operation 500 may effect content in glyph-mask buffer 115, consider FIG. 6. As shown, side buffer 600 includes: first anti-aliased string 605 rendered fully on transparent background 610; second string 615, some of which has been rendered onto opaque region 620, some of which has been rendered onto translucent region 625, and some of which has been rendered onto transparent background 610; and third string 630, some of which has been rendered under or behind opaque region 620, some of which has been rendered onto translucent region 625, and some of which has been rendered onto transparent background 610.

Also shown is glyph-mask buffer 635 having fully retained first glyph-mask 640 corresponding to first string 605 (see FIG. 5 sequence: 505→510→515→545→540→530). Those portions of glyph-masks 645 (corresponding to second string 615) and 650 (corresponding to third string 630) corresponding to opaque region 620 in side buffer 600 are obliterated or removed 655 (see FIG. 5 sequence: 505→510→515→520→550→540→530). Finally, those portions of glyph-masks 645 and 650 corresponding to translucent region 625 in side buffer 600 have their intensity reduced (see FIG. 5 sequence: 505→510→515→520→525→530).

Figure 7:
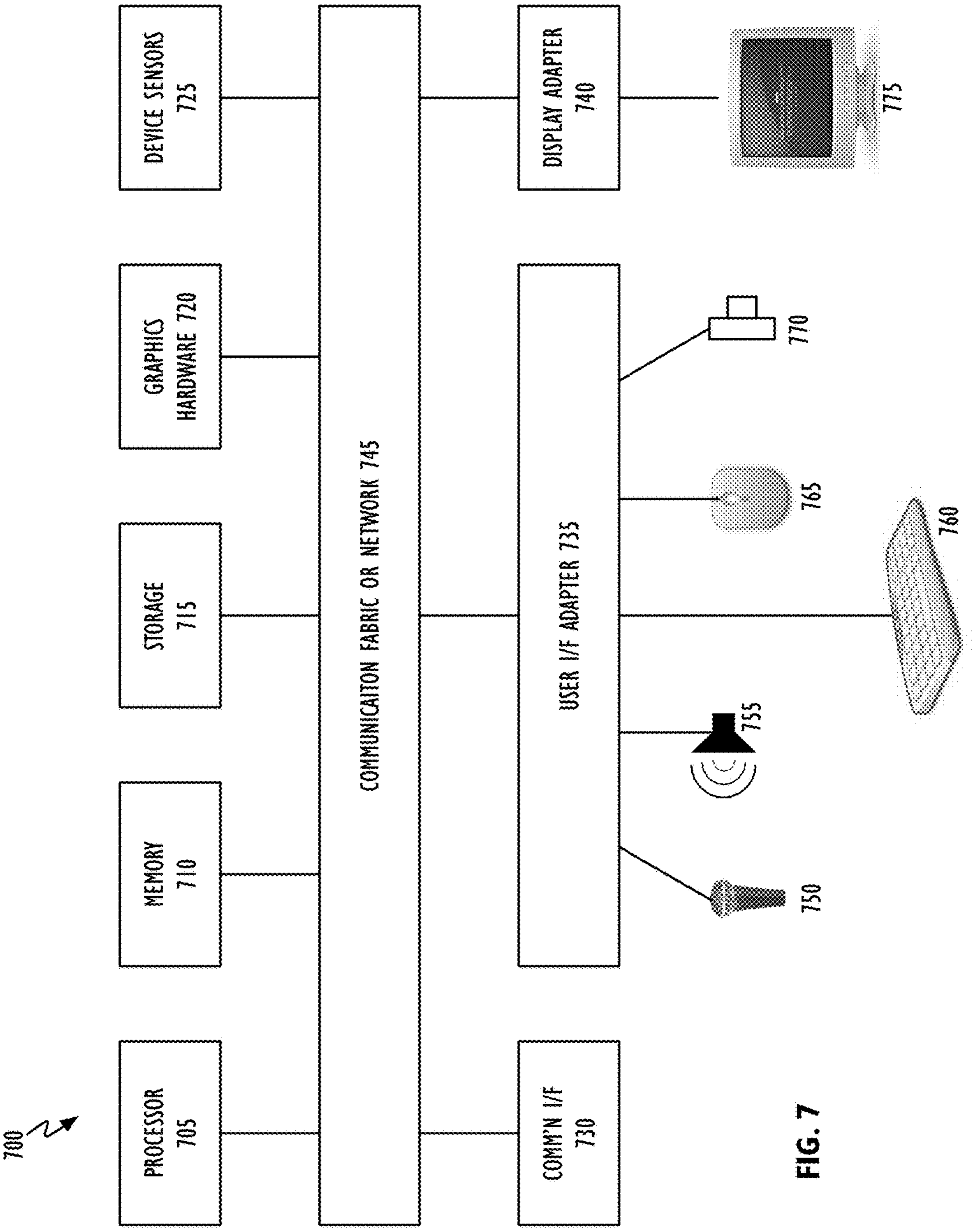
FIG. 7 shows, in block diagram form, a computer system in accordance with one or more embodiments.

Referring to FIG. 7, the disclosed glyph-aware render operations may be performed by representative computer system 700 (e.g., a general purpose computer system such as a desktop, laptop, notebook or tablet computer system). Computer system 700 may include processor element or module 705, memory 710, one or more storage devices 715, graphics hardware element or module 720, device sensors 725, communication interface module or circuit 730, user interface adapter 735 and display adapter 740—all of which may be coupled via system bus, backplane, fabric or network 745 which may be comprised of one or more switches or one or more continuous (as shown) or discontinuous communication links.

Processor module 705 may include one or more processing units each of which may include at least one central processing unit (CPU) and zero or more graphics processing units (GPUs); each of which in turn may include one or more processing cores. Each processing unit may be based on reduced instruction-set computer (RISC) or complex instruction-set computer (CISC) architectures or any other suitable architecture. Processor module 705 may be a single processor element, a system-on-chip, an encapsulated collection of integrated circuits (ICs), or a collection of ICs affixed to one or more substrates. Memory 710 may include one or more different types of media (typically solid-state) used by processor module 705 and graphics hardware 720.

For example, memory 710 may include memory cache, read-only memory (ROM), and/or random access memory (RAM). Storage 715 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 710 and storage 715 may be used to retain media (e.g., audio, image and video files), preference information, device profile information, computer program instructions or code organized into one or more modules and written in any desired computer programming language, and any other suitable data. When executed by processor module 705 and/or graphics hardware 720 such computer program code may implement one or more of the methods described herein. Graphics hardware 720 may be special purpose computational hardware for processing graphics and/or assisting processor module 705 perform computational tasks. In one embodiment, graphics hardware 720 may include one or more GPUs, and/or one or more programmable GPUs and each such unit may include one or more processing cores. In another embodiment, graphics hardware 720 may include one or more custom designed graphics engines or pipelines. Such engines or pipelines may be driven, at least in part, through software or firmware. Device sensors 725 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor, an electrostatic sensor, a temperature or heat sensor, a pixel array and a momentum sensor. Communication interface 730 may be used to connect computer system 700 to one or more networks or other devices. Illustrative networks include, but are not limited to, a local network such as a USB network, an organization's local area network, and a wide area network such as the Internet. Communication interface 730 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 735 may be used to connect microphone 745, speaker 750, keyboard 755, pointer device 760, and other user interface devices such as image capture device 765 or a touch-pad (not shown). Display adapter 740 may be used to connect one or more display units 770 which may provide touch input capability.

Figure 8:
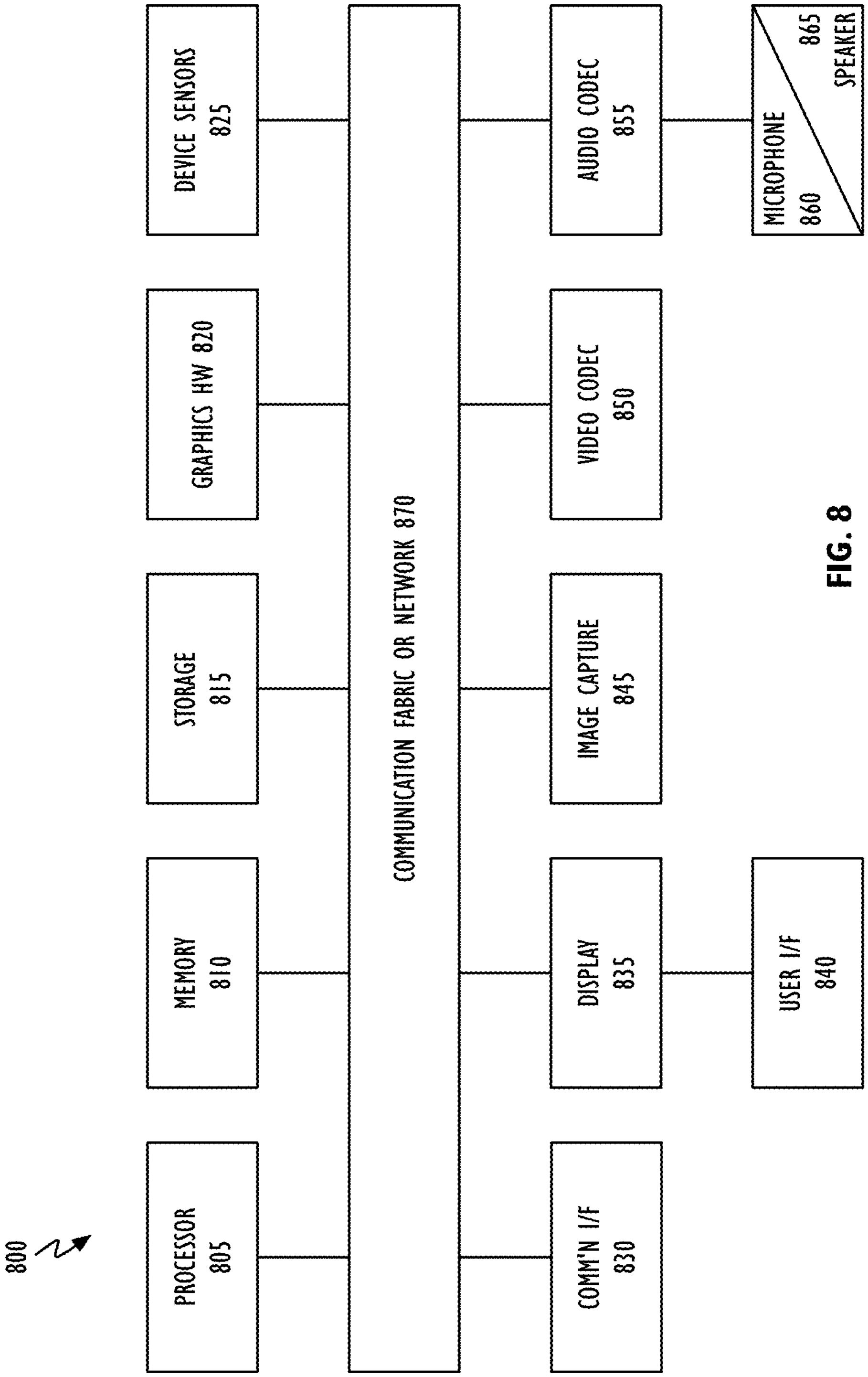
FIG. 8 shows, in block diagram form, a multi-function electronic device in accordance with one or more embodiments.

Referring to FIG. 8, the disclosed render operations may also be performed by representative mobile electronic device 800. Electronic device 800 could be, for example, a mobile telephone, a personal media device or a tablet computer system. As shown, electronic device 800 may include processor element or module 805, memory 810, one or more storage devices 815, graphics hardware 820, device sensors 825, communication interface 830, display element 835 and associated user interface 840 (e.g., for touch surface capability), image capture circuit or unit 845, one or more video codecs 850, one or more audio codecs 855, microphone 860 and one or more speakers 865—all of which may be coupled via system bus, backplane, fabric or network 870. Processor element or module 805, memory 810, one or more storage devices 815, graphics hardware 820, device sensors 825, communication interface 830, display element 835 and associated user interface 840 may be of the same or similar type and serve the same function as the similarly named component described above with respect to computer system 700. Output from an image capture unit element or module may be processed, at least in part, by video codec 850 and/or processor module 805 and/or graphics hardware 820, and/or a dedicated image processing unit incorporated within image capture unit 845. Images so captured may be stored in memory 810 and/or storage 815. Audio signals obtained via microphone 860 may be, at least partially, processed by audio codec 855. Data so captured may also be stored in memory 810 and/or storage 815 and/or output through speakers 865.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3 and 5 or the arrangement of elements shown in FIGS. 1, 2, 4 and 6-8 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for displaying content on a display unit, comprising:

storing, in a first memory, first information for display on a display unit, the display unit having a full display area, the first memory corresponding to a first region of the full display area, the first region corresponding to less than all of the display unit's full display area, wherein the first information includes color and transparency content;

storing, in a second memory, glyph-mask information of the first information, the second memory having a size equal to the first memory;

detecting a change in location of the first region to a second region of the full display area, the second region having second information;

updating the first information in the first memory to new information based on the first information, the second information and the glyph-mask information; and updating the glyph-mask information in the second memory by— removing the glyph-mask information from the second memory when the glyph-mask information corresponds to opaque new information in the first memory, and blending the glyph-mask information in the second memory with the new information when the glyph-mask information corresponds to translucent new information in the first memory.

2. The method of claim 1, wherein updating the second information in the second memory further comprises retaining the glyph-mask information in the second memory when the glyph-mask information corresponds to transparent new information in the first memory.

3. The method of claim 1, wherein storing first information in a first memory further comprises determining the first information includes anti-aliased text information.

4. The method of claim 3, wherein the glyph-mask information comprises the anti-aliased text information.

5. The method of claim 1, wherein updating the first information comprises blending the first information's color and transparency content with color and transparency information of the second information.

6. The method of claim 1, wherein the first and second memory comprise memory not directly displayed on the display unit.

7. The method of claim 6, wherein the first and second memory comprise backing memory of a display system's compositing engine.

8. A non-transitory program storage device comprising instructions stored thereon to cause one or more processors to:

store, in a first memory, first information for display on a display unit, the display unit having a full display area, the first memory corresponding to a first region of the full display area and less than all of the display unit's full display area, wherein the first information includes color and transparency content;

store, in a second memory, glyph-mask information of the first information, the second memory having a size equal to the first memory;

detect a change in location of the first region to a second region of the full display area, the second region having second information;

update the first information in the first memory to new information based on the first information, the second information and the glyph-mask information;

remove the glyph-mask information from the second memory when the glyph-mask information corresponds to opaque new information in the first memory; and blend the glyph-mask information in the second memory with the new information when the glyph-mask information corresponds to translucent new information in the first memory.

9. The non-transitory program storage device of claim 8, wherein further comprising instructions to retain the glyph-mask information in the second memory when the glyph-mask information corresponds to transparent new information in the first memory.

10. The non-transitory program storage device of claim 8, wherein the instructions to store first information in a first memory further comprise instructions to determine the first information includes anti-aliased text information.

11. The non-transitory program storage device of claim 10, wherein the glyph-mask information comprises the anti-aliased text information.

12. The non-transitory program storage device of claim 8, wherein the instructions to update the first information comprise instructions to blend the first information's color and transparency content with color and transparency information of the second information.

13. The non-transitory program storage device of claim 8, wherein the first and second memory comprise memory not directly displayed on the display unit.

14. The non-transitory program storage device of claim 13, wherein the first and second memory comprise backing memory of a display system's compositing engine.

15. A system comprising:

a display unit having a full display area;

memory operatively coupled to the display unit;

a compositing engine coupled to the memory; and one or more processors operatively coupled to the display unit, the memory, and the compositing engine, the one or more processors configured to execute instructions stored in the memory to cause the system to— store, by the compositing engine in a first buffer in the memory, first information for display on the display unit, the first buffer corresponding to a first region of the full display area and less than all of the display unit's full display area, wherein the first information includes color and transparency content, store, by the compositing engine in a second buffer in the memory, glyph-mask information of the first information, the second buffer having a size equal to the first buffer, detect a change in location of the first region to a second region of the full display area, the second region having second information, update, by the compositing engine, the first information in the first buffer to new information based on the first information, the second information and the glyph-mask information, remove, by the compositing engine, the glyph-mask information from the second buffer when the glyph-mask information corresponds to opaque new information in the first buffer, and replace, by the compositing engine, the glyph-mask information in the second buffer with a blend of the new information and the glyph-mask information when the glyph-mask information corresponds to translucent new information in the first buffer.

16. The system of claim 15, wherein the instructions further comprise instructions to retain the glyph-mask information in the second buffer when the glyph-mask information corresponds to transparent new information in the first buffer.

17. The system of claim 15, wherein the instructions to store first information in a first buffer further comprise instructions to determine the first information includes anti-aliased text information.

18. The system of claim 17, wherein the glyph-mask information comprises the anti-aliased text information.

19. The system of claim 15, wherein the instructions to update the first information comprise instructions to blend the first information's color and transparency content with color and transparency information of the second information.

20. The system of claim 15, wherein the first and second buffers comprise memory not directly displayed on the display unit.

21. The system of claim 20, wherein the first and second buffers comprise backing memory of the compositing engine, wherein the compositing engine is provided by an operating system.

* * * * *